US012476483B2

(12) United States Patent
Santana et al.

(10) Patent No.: US 12,476,483 B2
(45) Date of Patent: Nov. 18, 2025

(54) ENERGY SOURCE TRACKING SYSTEM (71) Applicant: Hygge Energy Inc., Toronto (CA)

(72) Inventors: Leticia Santana, Toronto (CA); Rajagopalan Krishnamurthy, Toronto (CA); Ishan Kashyap, Toronto (CA)

(73) Assignee: HYGGE ENERGY INC., Toronto (CA)

( * ) Notice: Subject to any disclaimer, the term of this patent is extended or adjusted under 35 U.S.C. 154(b) by 0 days.

(21) Appl. No.: 18/876,823

(22) PCT Filed: Aug. 22, 2023

(86) PCT No.: PCT/CA2023/051107
§ 371 (c)(1),
(2) Date: Dec. 19, 2024

(87) PCT Pub. No.: WO2024/040338
PCT Pub. Date: Feb. 29, 2024

(65) Prior Publication Data
US 2025/0175032 A1    May 29, 2025

(30) Foreign Application Priority Data

Aug. 25, 2022   (CA) .............................. CA 3171151

(51) Int. Cl.
*H02J 13/00* (2006.01)
*G06Q 10/04* (2023.01)
*G06Q 50/06* (2024.01)
*H02J 3/38* (2006.01)

(52) U.S. Cl.
CPC ........ *H02J 13/00002* (2020.01); *G06Q 10/04* (2013.01); *G06Q 50/06* (2013.01); *H02J 3/381* (2013.01); *H02J 2203/10* (2020.01); *H02J 2310/12* (2020.01); *H02J 2310/70* (2020.01)

(58) Field of Classification Search
CPC .. H02J 13/00002; H02J 3/381; H02J 2203/10; H02J 2310/12; H02J 2310/70; G06Q 10/04; G06Q 50/06
See application file for complete search history.

(56) References Cited

U.S. PATENT DOCUMENTS

2004/0225648 A1* 11/2004 Ransom ................. G06Q 10/10
2011/0106321 A1*  5/2011 Cherian ............ H02J 13/00034
                                                                700/286

(Continued)

FOREIGN PATENT DOCUMENTS

WO    2021168149 A1   8/2021

OTHER PUBLICATIONS

International Search Report issued Oct. 31, 2023 for corresponding PCT Application No. PCT/CA2023/051107.

(Continued)

*Primary Examiner* — Ziaul Karim (57) ABSTRACT

The disclosure relates to a method of renewable energy tracking and directing. Renewable energy production, storage, and consumption are tracked, and then attributed to different applications. The method can optimally attribute renewable energy to carbon-displacing applications to maximize carbon impact and monetization of carbon displacement. Additionally, blockchain technology is used to unalterably record the carbon traces.

22 Claims, 10 Drawing Sheets

(56) References Cited

U.S. PATENT DOCUMENTS

| | | | |
|---|---|---|---|
| 2013/0173322 A1* | 7/2013 | Gray | H02J 13/00017 |
| | | | 705/7.13 |
| 2016/0313716 A1* | 10/2016 | Chen | H02J 4/00 |
| 2019/0163152 A1* | 5/2019 | Worrall | H02J 3/003 |
| 2021/0221247 A1* | 7/2021 | Daniel | B60L 55/00 |

OTHER PUBLICATIONS

Written Opinion issued Oct. 31, 2023 for corresponding PCT Application No. PCT/CA2023/051107.
Examiner Report issued Jan. 31, 2023 for corresponding CA Application No. 3171151.

* cited by examiner

Allocation with carbon-impact maximization

| User | Loads | | Consumption | Green | Source (user_1, user_2, ..., utility) |
|---|---|---|---|---|---|
| User 1 | General | General | 17 kwh | 8 kwh | {(5, 0), (3,0), ..., (0, 9)} |
| | Load 1 | Heating | 5kwh | 3kwh | {(0, 0), (3, 0), ..., (0, 2)} |
| | Load 2 | Ev_charger | 5kwh | 5kwh | {(5, 0), (0, 0), ..., (0, 0)} |
| | Load 3 | Battery | 2 kwh | 0 kwh | {(0, 0), (0, 0), ..., (0, 2)} |
| | Load 4 | Kitchen appliance | 5 kwh | 0 kwh | {(0, 0), (0, 0), ..., (0, 5)} |
| User 2 | General | General | 2kwh | 2kwh | {(0, 0), (2, 0), ..., (0, 0)} |
| | Load 1 | Heating | 2kwh | 2kwh | {(0, 0), (2, 0), ..., (0, 0)} |
| | Load 2 | Kitchen appliance | 0 | 0kwh | {(0, 0), (0, 0), ..., (0, 0)} |

Renewable energy available

| User | Energy Resources | Production source (kwh solar, kwh utility) |
|---|---|---|
| User 1 | Solar | (5, 0) |
| | Battery | (0, 0) |
| | Load | 12 kwh |
| | Net | -7 kwh |
| User 2 | Solar | (5, 0) |
| | Load | 2 kwh |
| | Net | 3 kwh |

Allocation with carbon-impact maximization (green energy is evenly split)

| User | Loads | | Consumption | Green | Source (user_1, user_2, ..., utility) |
|---|---|---|---|---|---|
| User 1 | General | General | 17 kwh | 8 kwh | {(5, 0), (3,0), ..., (0, 4)} |
| | Load 1 | Heating | 5kwh | 2 kwh | {(1.25, 0), (0.75, 0), ..., (0, 2)} |
| | Load 2 | Ev_charger | 5kwh | 2 kwh | {(1.25, 0), (0.75, 0), ..., (0, 2)} |
| | Load 3 | Battery | 2 kwh | 2 kwh | {(1.25, 0), (0.75, 0), ..., (0, 2)} |
| | Load 4 | Kitchen appliance | 5kwh | 2 kwh | {(1.25, 0), (0.75, 0), ..., (0, 2)} |
| User 2 | General | General | 2kwh | 2kwh | {(2, 0), (0, 0), ..., (0, 0)} |
| | Load 1 | Heating | 2kwh | 2kwh | {(2, 0), (0, 0), ..., (0, 0)} |
| | Load 2 | Kitchen appliance | 0 | 0kwh | {(0, 0), (0, 0), ..., (0, 0)} |

ENERGY SOURCE TRACKING SYSTEM

CROSS-REFERENCE TO RELATED APPLICATIONS

This application is a U.S. National Stage of International Application No. PCT/CA2023/051107, filed Aug. 22, 2023, which claims the benefit of CA Patent Application No. 3,171,151, filed Aug. 25, 2022, now CA patent No. 3,171,151, each of which is hereby incorporated by reference in its entirety.

TECHNICAL FIELD

The present disclosure relates to an energy source tracking system, and in particular to an energy source tracking and directing system that accurately measures the carbon impact, i.e. decarbonization, of local renewable sources of energy.

BACKGROUND

Traditional energy production accounting is done on a one-to-one basis between the utility and the exporter using methods such as net-metering. Each utility customer who has a generation resource, e.g. a renewable energy source such as solar panels or wind generator, produces a certain amount of power every instant totaling to a certain energy over each day depending on various factors, such as the amount of sunlight. A portion of this power goes to serve the customer's local energy needs and the remaining is exported on to the utility grid. The sum of this exported power is the net energy exported by the customer and is deemed to have been delivered to the utility. The customer is credited for this energy using some predetermined method. In reality, the energy exported flows laterally to nearby consumers to serve their consumption at each instant, without having to be transformed (stepped up) or transmitted a great distance leading to losses.

Unfortunately, in the traditional method, there is no accounting for lateral energy/power flow. With the proliferation of distributed energy resources (DERs), we can expect that in future economies there will be more lateral flow of power and energy. It is also anticipated that individuals and communities will want to take account of such lateral flows and benefit from it, giving rise to methods such as community net-metering or/and energy trading between neighbors (peer-to-peer transactional energy).

Conventional energy source tracking systems may not permit communities to accurately measure the impact of local renewable sources on their carbon footprint, and may not enable the communities to improve on their carbon footprint by directing them to more carbon displacing applications. Currently, the mix of energy is only tracked at an aggregate or average level, and any community that consumes power from a blend of energy sources has no way to direct the renewable percentage for certain applications. In reality a community's locally produced renewable energy is almost entirely consumed within that community, and accounts for a much larger impact than it is credited for.

Different applications have different impacts in terms of their carbon footprint, for example, electric heating replaces the consumption of natural gas, whereas electric vehicles replace the consumption of gasoline. Similarly, applications which are intended to displace carbon may not actually displace carbon unless the energy used to fuel them is renewable energy. For example, electric vehicles (EV's) charged from a fossil fuel power plant are not as carbon-friendly as one powered by a renewable energy source, since the EV is at least partially running on dirty energy.

An object of the present disclosure is to provide a true carbon impact within a community.

SUMMARY

Accordingly, a first method includes a method of determining decarbonization impact of one or more distributed energy resources (DER) with one or more related site loads in a community of consumers, comprising:
a) determining energy resource data relating to an amount of electrical energy exported by each DER, and simultaneously an amount of electrical energy consumed by each site load from each DER and from a local energy grid, using monitoring devices related to each DER and each site load;
b) obtaining application information from each site load relating to each application the electrical energy is used, using the monitoring devices;
c) determining community consumption data based on instantaneous portions of the electrical energy exported by each DER to each site load in the community of consumers from the energy resource data using a controller processor executing instructions stored on non-transitory memory; and
d) correlating the energy resource data, the community consumption data and the application information to determine carbon-tracking records based on the decarbonization impact of each DER using the controller processor.

Step b) may include obtaining application information from a building management system about at least one of one or more specific decarbonization target loads and their activity. Decarbonization target loads include but are not limited to air conditioners and heaters.

In any of the aforementioned embodiments step b) may include obtaining application information from electrical vehicle chargers of at least one of the one or more site loads when an electrical vehicle is plugged in and charging.

In any of the aforementioned embodiments step b) may include power disaggregation, which identifies various electrical energy loads by their power signature.

The method of any of the aforementioned embodiments may further comprise storing one or more of the energy resource data, the community consumption statistics and the application information in a blockchain.

The method of any of the aforementioned embodiments, wherein each monitoring box may host an embedded node containing a record of the blockchain.

The method of any of the aforementioned embodiments may further comprise storing a duplicate of each embedded node in cloud memory.

The method of any of the aforementioned embodiments wherein the community of consumers may comprise a group of consumers situated in substantially close geographic proximity, sharing a system of electrical transmission lines in a distribution network.

The method of any of the aforementioned embodiments wherein the step d) may include accounting for all of the electrical energy produced by each DER, and accounting for all of the electrical energy consumed by each site load.

The method of any of the aforementioned embodiments wherein the step d) may include attributing at least some of the electrical energy produced by each DER to the consumption of electrical energy by electrical vehicle chargers at each site load.

The method of any of the aforementioned embodiments may further comprise using the carbon tracking records to obtain carbon credits in a carbon tracking system.

The method of any of the aforementioned embodiments wherein the carbon tracking records may include, for each site load, an accounting of energy produced and energy consumption;
- wherein the energy consumption may include a list of each application, an amount of energy consumed, and whether the application is green; and
- wherein a green energy surplus in one of the site loads may be applied to one or many green loads of other site loads with a goal to maximize the overall decarbonization impact of each DER.

A first system for determining decarbonization impact of one or more distributed energy resources (DER) with one or more related site loads in a community of consumers, may comprise:
- sensors configured to determine energy resource data relating to an amount of electrical energy exported by each DER, and an amount of electrical energy consumed by each site load;
- monitoring boxes configured to obtain application information from each site load relating to what application the electrical energy is used; and
- a controller processor; and
- non-transitory memory storing instructions, which when executed by the controller processor is configured to determine portions of the electrical energy exported by each DER to each site load; and correlate the energy resource data and the application information to determine carbon-tracking records based on the decarbonization impact of each DER.

The system of any of the aforementioned embodiments wherein the monitoring boxes may be configured to obtain application information from a building management system of at least one of the one or more site loads when an air conditioner and/or a heater turns on.

The system of any of the aforementioned embodiments wherein the monitoring boxes may be configured to obtain application information from electrical vehicle chargers of at least one of the one or more site loads when an electrical vehicle is plugged in and charging.

The system of any of the aforementioned embodiments wherein the monitoring boxes may be configured to obtain application information by power disaggregation, which identifies various electrical energy loads by their power signature.

The system of any of the aforementioned embodiments wherein one or more of the energy flow data, and the application information may be stored in a blockchain.

The system of any of the aforementioned embodiments wherein each monitoring box may host an embedded node containing a record of the blockchain.

The system of any of the aforementioned embodiments wherein a duplicate of each embedded node may be stored in cloud memory.

The system of any of the aforementioned embodiments wherein the community of consumers may comprise a group of consumers situated in substantially close geographic proximity, sharing a system of electrical transmission lines in a distribution network.

The system of any of the aforementioned embodiments wherein the controller processor may be configured for accounting for all of the electrical energy produced by each DER, and accounting for all of the electrical energy consumed by each site load.

The system of any of the aforementioned embodiments wherein the controller processor may be configured for attributing at least some of the electrical energy produced by each DER to the consumption of electrical energy by electrical vehicle chargers at each site load.

BRIEF DESCRIPTION OF THE DRAWINGS

Some example embodiments will be described in greater detail with reference to the accompanying drawings, wherein.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

The present disclosure relates to a system for and a method of tracking renewable energy production, storage, and consumption to specific, carbon-displacing applications to maximize carbon impact and monetization of carbon displacement. By attributing the use of renewable energy to different applications, e.g. heating, air conditioning and electric vehicles, that have varying carbon impacts, the system can determine an accurate measure of the benefits of renewable energy generation and use. The present system and method use a blockchain methodology to unalterably record the carbon traces with decoupled and untethered block chain processes.

The present system can be used with the systems disclosed in U.S. patent application Ser. No. 17/085,414 filed Oct. 30, 2020, entitled Method and System for Green Energy Charging of Electric Vehicles, in the name of Bangalore et al; U.S. patent application Ser. No. 17/218,631 filed Mar. 31, 2021, entitled Optimizing Distributed Energy Resource Value in the name of Krishnamurthy et al; and U.S. Patent Application No. 63/293,362 filed Dec. 23, 2021, entitled Energy Trading System, in the name of Krishnamurthy et al, which are all incorporated herein by reference in their entirety.

Figure 1:
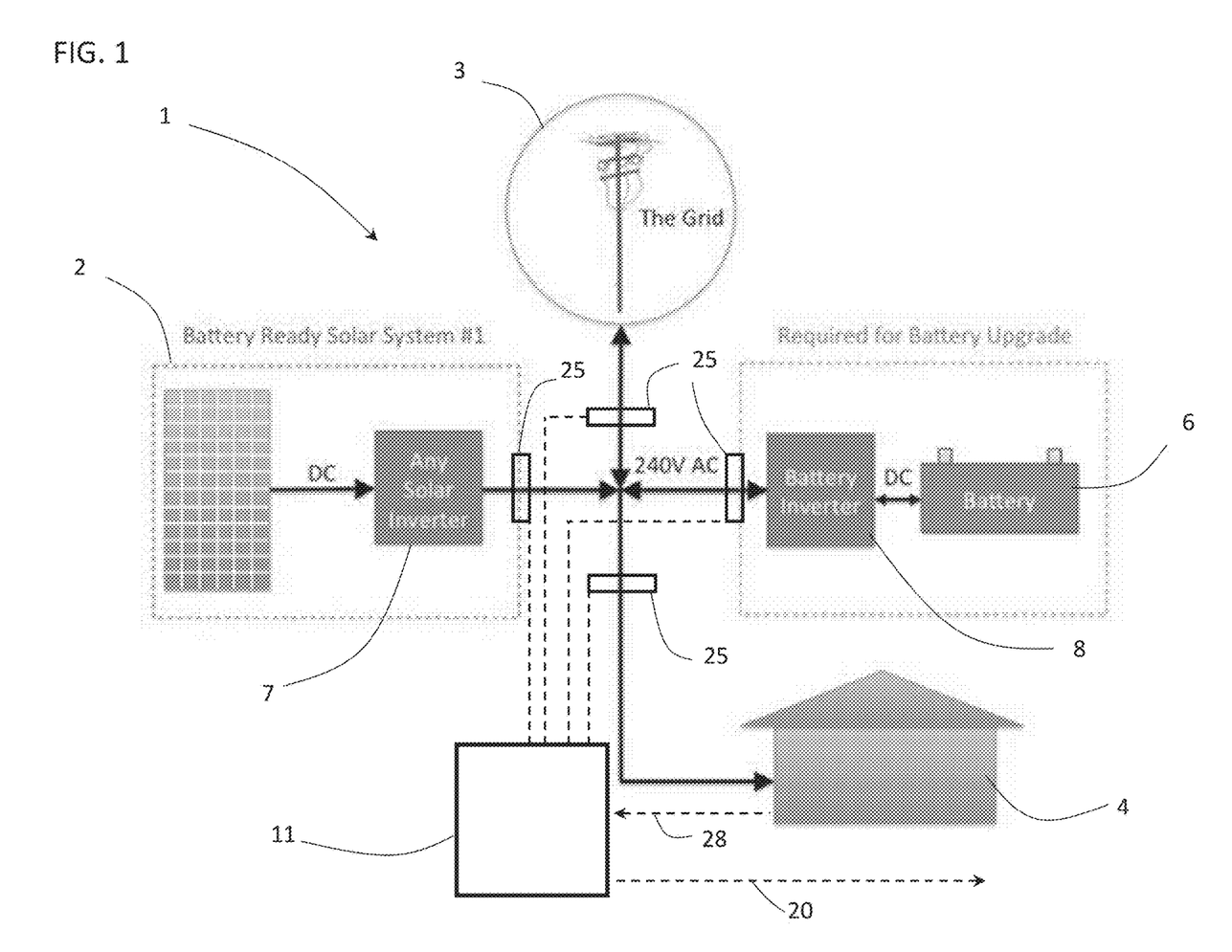
FIG. 1 is a schematic diagram of a distributed energy resource (DER) in accordance with an example.

With reference to FIG. 1, a distributed energy resource (DER) system 1 uses a renewable energy source generators 2, such as small hydro, biomass, biogas, solar power, wind power, and geothermal power, to supply electrical power to an electric power distribution system, i.e. a local utility grid 3, and/or a site load 4. A grid-connected DER 1 may include a battery 6 for storing electrical power generated from the renewable energy source generators 2. In which case the DER system 1 may be called a distributed energy storage system (DESS). An electrical inverter 7 may be provided configured to convert the DC electrical signals from the renewable energy source generators 2 for transmission to the grid 3 or the corresponding site load 4. A battery electrical inverter 8 may be provided for converting the electrical power between DC (for the battery 6) and AC (for the grid 3 and/or the site load 4). By means of an interface, e.g. a monitoring box 11, the DER system 1 can be managed and coordinated within a smart grid. Distributed generation and storage of electrical energy enables the collection of energy from many sources and may lower environmental impacts and improve the security of the power supply.

Figure 2:
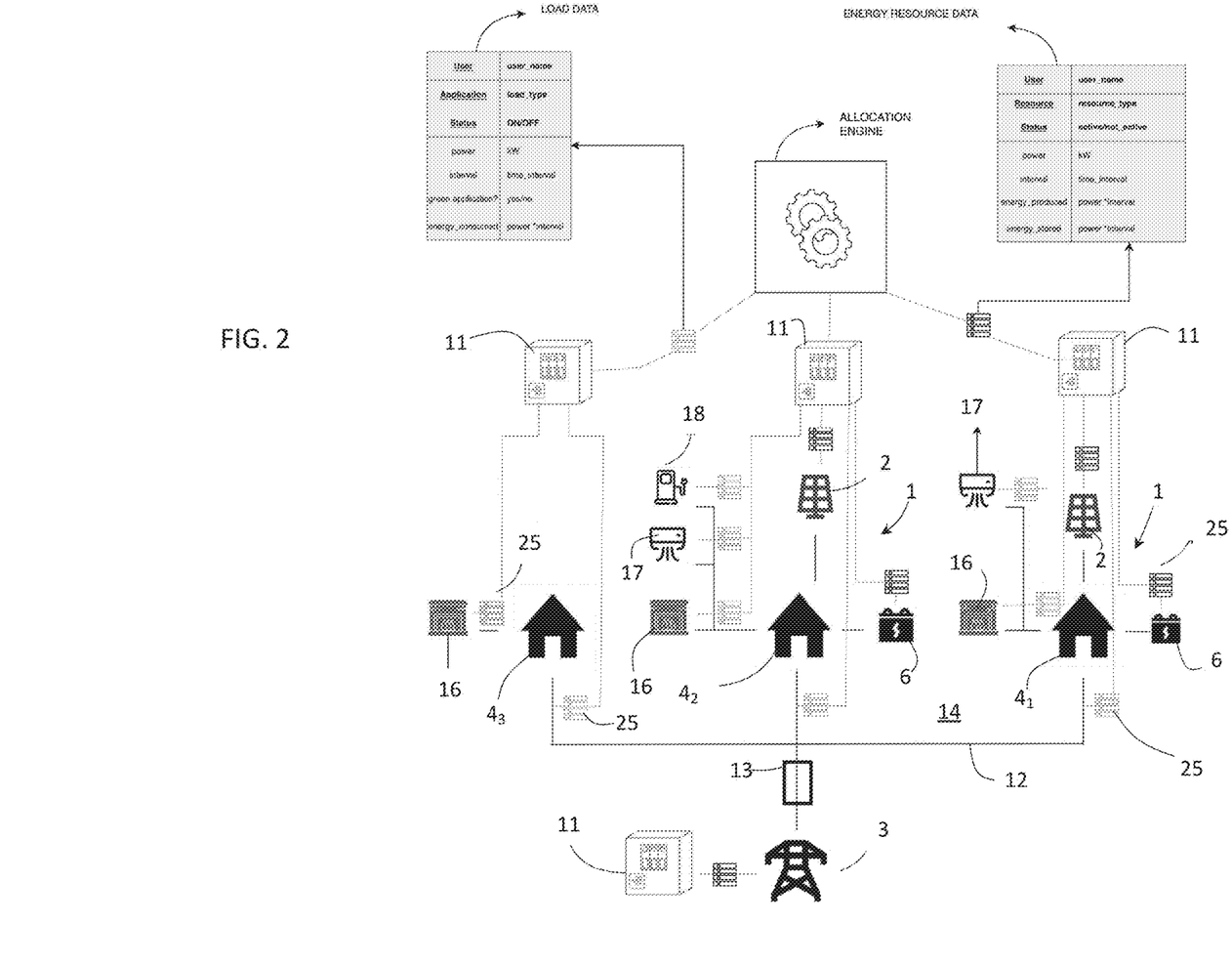
FIG. 2 is a schematic diagram of a community including the DER of FIG. 1 with an exemplary carbon tracking system.

With reference to FIG. 2, a community of consumers includes one or more DER's 1, which generates a surplus of electrical energy; a plurality of consumers, i.e. site loads $4_1$ to $4_n$, which consume electrical energy; and optional electrical storage devices, e.g. batteries 6. The community of consumers can be defined as a group of consumers, e.g. situated in substantially close geographic proximity, sharing a system of electrical transmission lines 12 in a distribution network, in some examples even sharing a transformer 13. Some examples of communities include: 1) small remote villages in India; 2) a select subset of a community, such as a private consumer with a DER 1, and a plurality of community consumers, e.g. site loads 4, such as city infrastructure buildings, with one or more of the private consumer, the city or a third party local utility company owning the electrical storage devices, e.g. batteries 6, as in Erin, Ontario; 3) five co-owned buildings in a loose campus setting, such as GNDEC engineering university in India, which share excess power from a DER 1; and 4) multiple business campuses spread across an urban and/or peri-urban Bangkok, Thailand trading green power from a DER 1 amongst themselves to offset their carbon footprint In the long term, a community may comprise a substation, including one or more DER's 1, providing a community of consumers, i.e. site loads $4_1$ to $4_n$, under its umbrella renewable energy locally produced with the ability to provide surplus power to the grid 3 during normal operation and to continue supplying a community microgrid 14, at least essential services, during extended outages.

Microgrids are modern, localized, small-scale grids, contrary to the traditional, centralized electricity grid 3. Microgrids can disconnect from the centralized grid 3 and operate autonomously, strengthen grid resilience, and help mitigate grid disturbances. Microgrids are typically low-voltage AC grids, which use a renewable energy source and may use diesel generators as backup, and are installed by the community they serve. Microgrids increasingly employ a mixture of different distributed energy resources, such as solar hybrid power systems, which significantly reduce the amount of carbon emitted.

Monitoring devices 11 are distributed around a distribution network, e.g. in each community grid and/or each microgrid 14, and are associated with consumers, "front of the meter" distributed energy resources (DER) 1, such as generators, storage batteries etc. or with distribution network assets, such as transformers, relays, reclosers, switches, etc. At consumer premises or other site loads $4_1$ to $4_n$, the monitoring devices 11 may be linked with "behind the meter" distributed energy resources (DER) 1, such as the storage batteries 6, the renewable energy sources 2, e.g. photovoltaic (PV) generators, diesel generators, etc., and can be configured to manage the microgrid 14, such as the community grid.

Figure 3:
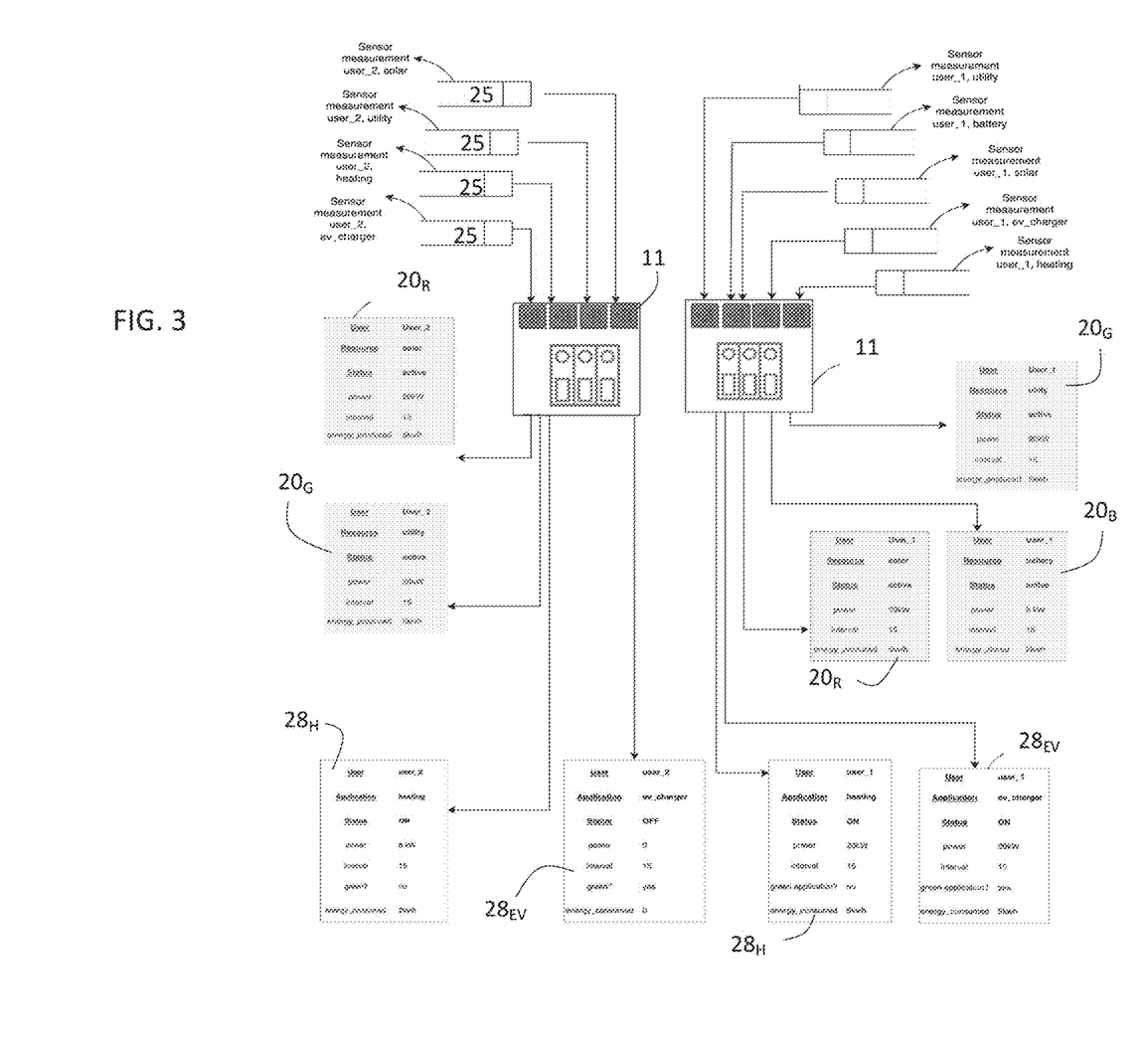
FIG. 3 is a schematic diagram of inputs and outputs of monitoring devices from the community of FIG. 2.
Figure 4:
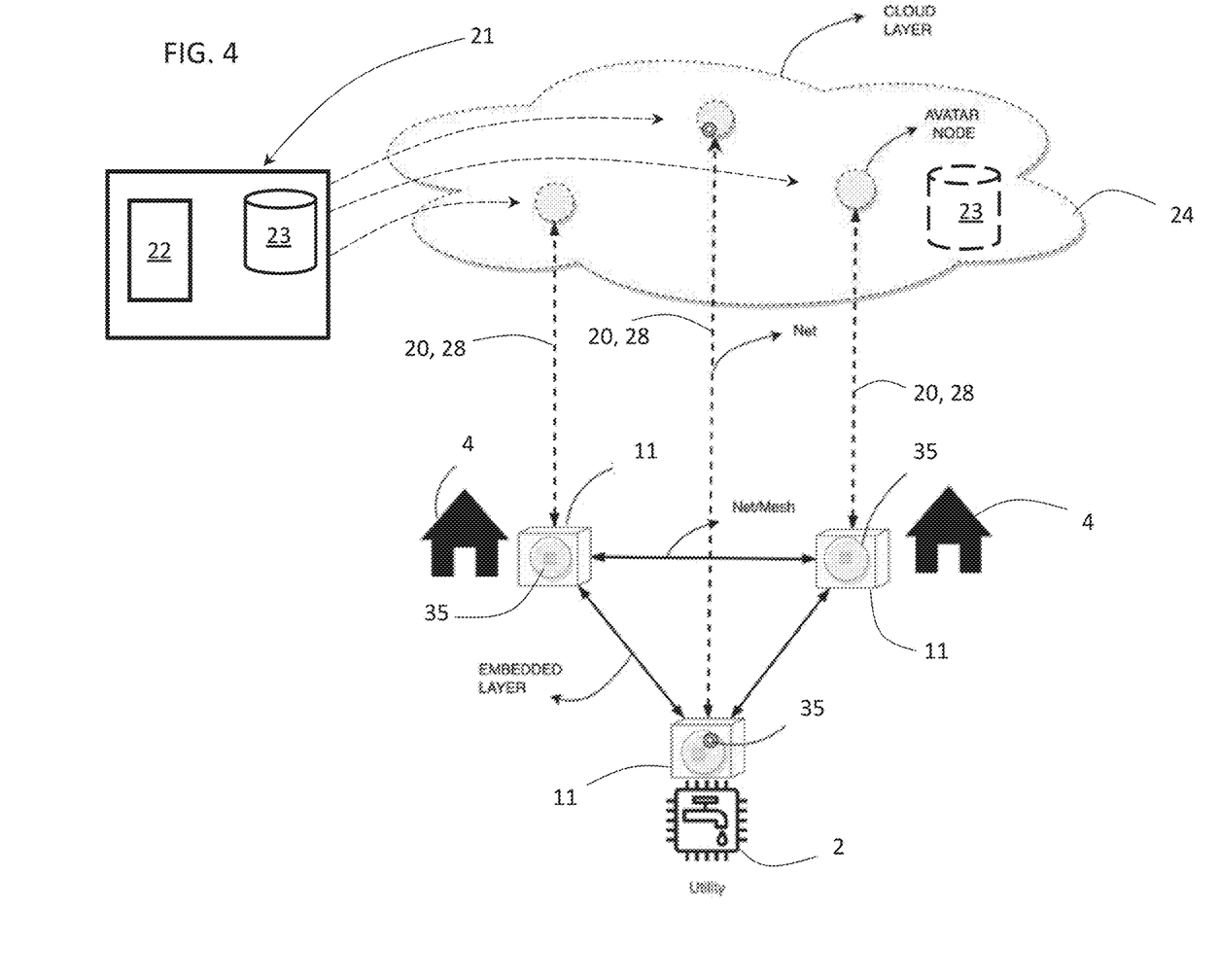
FIG. 4 is a schematic diagram of a community including the DER of FIG. 1.

With reference to FIGS. 3 and 4, each monitoring device 11 may measure or collect energy resource data 20, e.g. data relating to the flow of electrical energy, for example: 1) energy resource data $20_R$ from the DER 1 to the grid 3 and to the consumer site loads $4_1$ to $4_n$, 2) energy resource data $20_G$ from the grid 3 to consumer site loads $4_1$ to $4_n$, and 3) energy resource data $20_B$ from the battery 6 to the consumer site loads $4_1$ to $4_n$, and upload the energy resource data 20 to a carbon tracking system 21, comprising a controller processor 22 executing computer instructions stored in non-transitory memory 23 e.g. in the cloud 24. The energy resource data 20 can be stored in a blockchain network 31 (FIG. 4) in blockchains 32 in a blocks 33 in files and databases 34 or any other suitable method of data storage.

Figure 5:
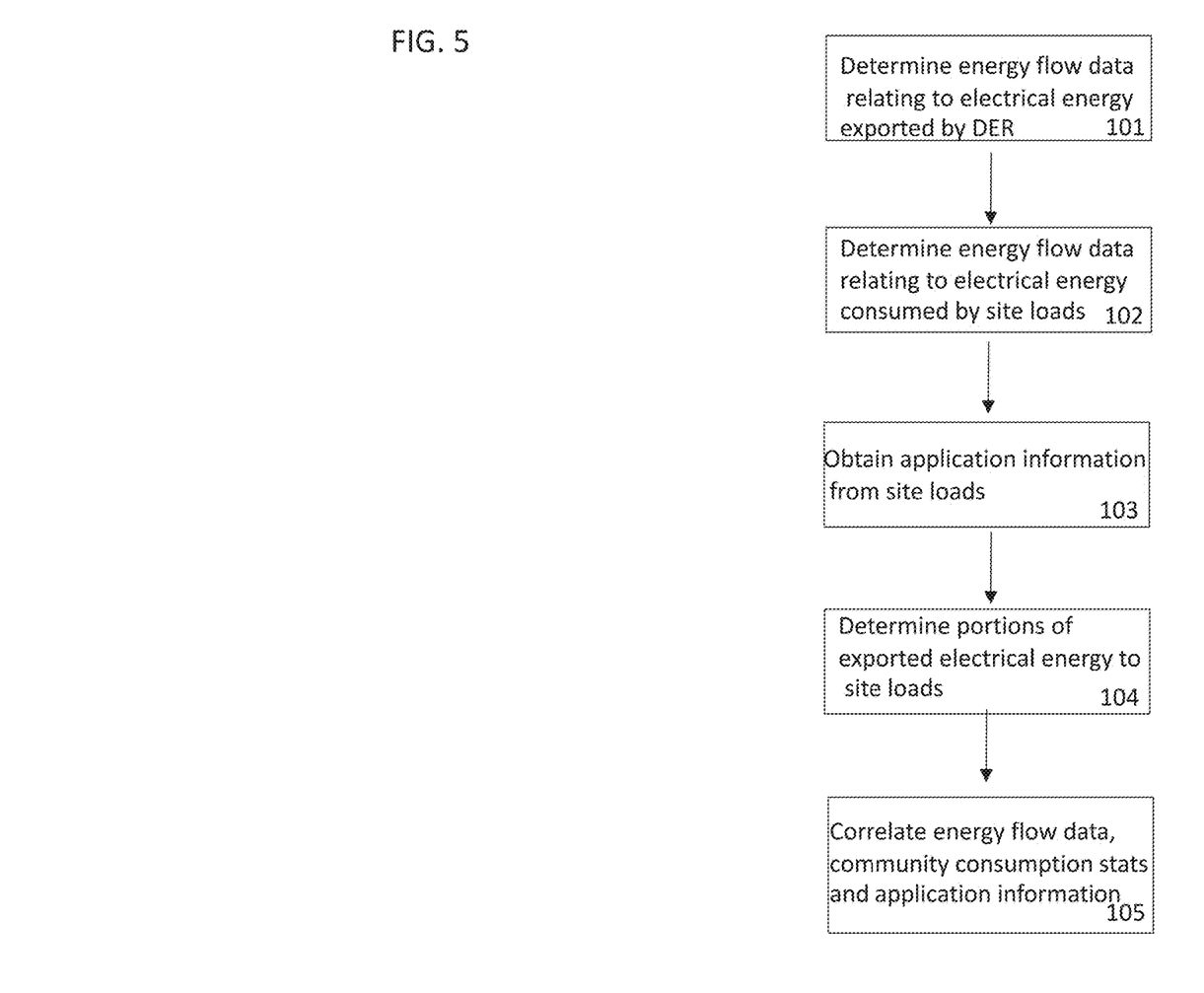
FIG. 5 is a flow chart of the method of operating the carbon tracking system of FIG. 2.

With reference to the flow chart of FIG. 5, each monitoring device 11 collects the energy resource data 20 continuously for production by each DER 1 (step 101), and for energy consumption by each site load $4_1$ to $4_n$ (step 102), such as power rating, energy flow and type of usage. A plurality of sensors 25, e.g. volt meters and/or power meters, are positioned in the consumer network 14 in communication with one or more of the monitoring device 11 for measuring and transmitting the energy resource data 20. The energy resource data 20 may include one or more of the following: the specific user (site load $4_1$ to $4_n$), the source of the energy (renewable energy source 2, the grid 3 or the battery 6), the status of the source (active or OFF), the power available (KW), the time or date interval (hours and/or days), and the energy used (KW). Each monitoring device 11 may also obtain application information 28 from the site loads 4 relating to what applications, e.g. heater $28_H$, air conditioner $28_{AC}$, EV charger $28_{EV}$, etc. the electrical energy is being used for (step 103). The application information 28 may include one or more of the following: the specific user (site load $4_1$ to $4_n$), the application (e.g. heater 16, air conditioner 17, EV charger 18), the status of the application (active or OFF), the power used (KW), the time or date interval (hours and/or days), and whether the power used was green or not. The monitoring device 11 may collect the application information 28 from the consumer premises, e.g. the site loads $4_1$ to $4_n$, in one of a plurality of ways, such as via building management systems, which can communicate signals, via a suitable communication network, when the AC or the heater turns on, and EV chargers, which can communicate signals via a suitable communication network when an EV is plugged in and charging. Additionally, the monitoring device 11 can deploy an approach known as power disaggregation which identifies various loads by their power signature.

FIGS. 2 to 4 illustrate the flow of data from the monitoring devices 11 to the carbon tracking system 21 and back, as in an exemplary embodiment. The monitoring devices 11 send the application information 28 with the energy resource data 20, including measurements from the sensors 25, to an allocation engine algorithm as part of the carbon tracking system 21. The allocation engine algorithm may be stored in one or more of a remote location with or without the tracking system 21, in the cloud with or without the tracking system 21 or in one of the monitoring devices 11. An example of an allocation engine is disclosed in U.S. patent application Ser. No. 17/218,631 filed Mar. 31, 2021, entitled Optimizing Distributed Energy Resource Value in the name of Krishnamurthy et al, which is incorporated herein by reference. The allocation algorithm calculates the allocation, sends each allocation back to the monitoring device 11 and to a database. The database may be in memory 23 provided in the cloud 24 and/or in a remote location connected to the controller processor 22. The allocation table is stored in memory (cloud based or monitoring box or remote), which is sent to the data memory 23 within the carbon tracking system 21.

Figure 6:
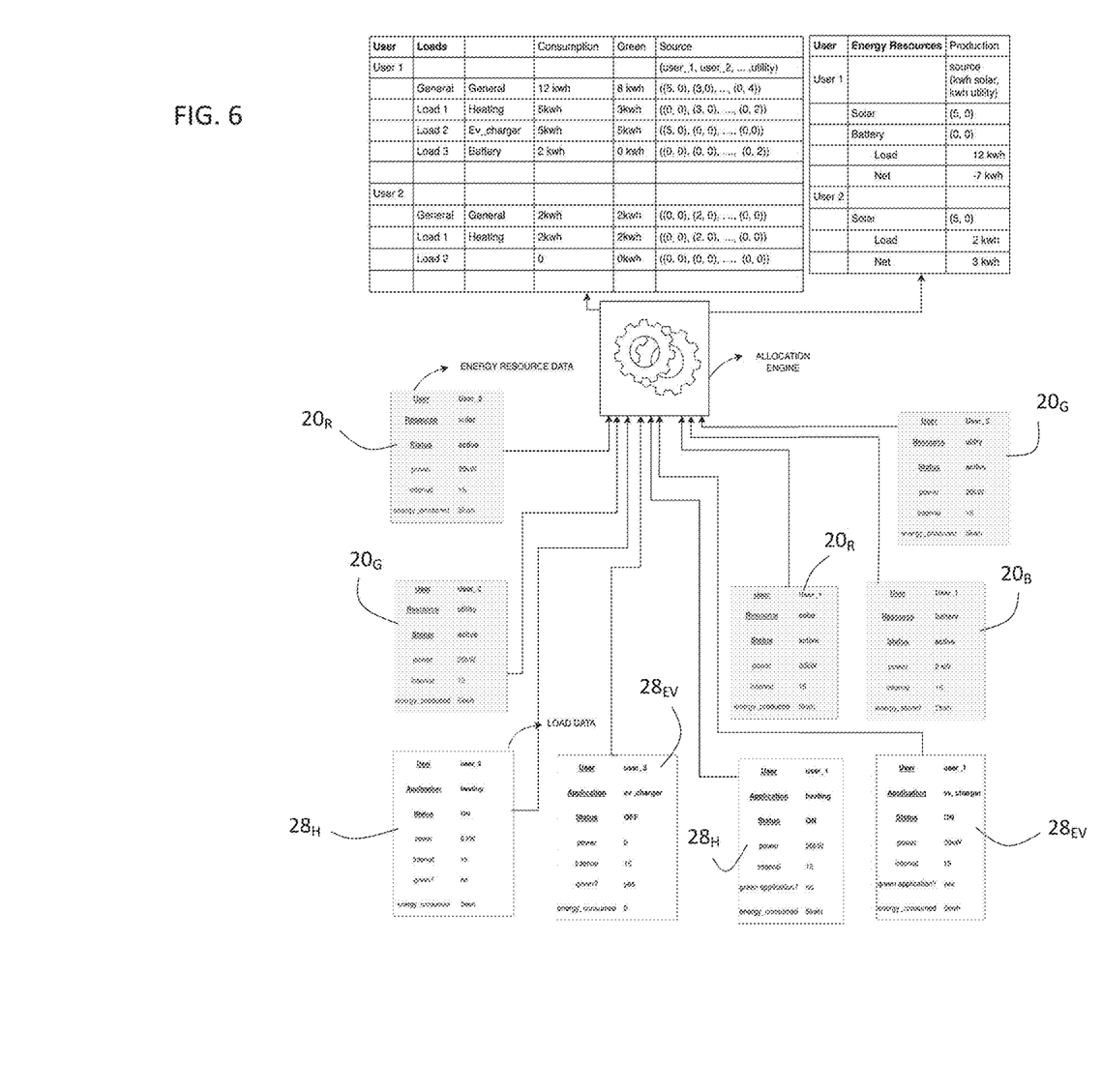
FIG. 6 is a schematic diagram of inputs and outputs from an allocation engine of the exemplary carbon tracking system of FIG. 2.

With reference to the table in FIG. 6, the database may include a compilation of the application information 28 for the various different users, site loads 41 to 4n, along with the corresponding total energy consumption (kwh) and a breakdown of the individual consumption of the various applications or loads, e.g. heater 16, AC 17 and/or EV charger 18. The database may also include a compilation of the energy resource data 20 including the various different users, e.g. site loads 41 to 4n, along with the source of any power consumed, e.g. renewable source 2, grid 3 or battery 6, along with an accounting of the amount of energy generated by each DER 1, the amount of energy used by each battery 6 and the amount of energy consumed by each site load site loads 41 to 4n to provide a net energy amount.

Currently, while it is physically impossible to identify where exactly the electrons are flowing, it is possible to allocate such exported energy to different users in an accounting manner. For example, five neighboring site loads $4_1$ to $4_n$ in a community, may be connected by a wire under a single transformer. When one of these site loads $4_1$ to $4_n$ export energy via a DER 1, there is no way to represent how much exported electricity went to a specific neighboring site load $4_1$ to $4_n$. However, from the energy flow data 20, the carbon tracking system 21 is able to measure how much energy is exported instantaneously by the DER 1 from the energy flow data 20 from the DER 1, and how much energy is consumed by each neighboring site load $4_1$ to $4_n$ from the corresponding energy flow data from those site loads 41 to 4n, to thereby assign appropriate portions of the exported electrical energy as having been delivered by each DER 1 to each consuming site load $4_1$ to $4_n$ in the community as community consumption statistics (Step 104, FIG. 5).

In some embodiments, the allocation algorithm of the carbon tracking system 21 then determines the applications of the renewable energy to maximize carbon impact and carbon displacement. The monitoring devices 11 communicate the application information 28 to the carbon tracking system 21. The carbon tracking system 21 uses the allocation engine, which tracks and allocates the renewable energy sources from each DER 1 and any storage from batteries 6 involved in the process that serves each carbon impacting application at each site load $4_1$ to $4_n$. In another configuration, where the monitoring devices 11 are disconnected from the carbon tracking system 21, one of the monitoring devices 11 may assume the role of the allocation engine. The allocation engine can then attribute a source, e.g. the renewable energy source 2, the grid 3 or the battery 6, to the different applications that have varying carbon impacts. Depending on its configuration, the allocation engine can allocate more renewable energy to specific applications identified, with the aim of maximizing for carbon-displacing applications and monetization of carbon displacement.

The energy flow data 20, the community consumption statistics and the application information 28 are then correlated by the carbon tracking system 21 (Step 105, FIG. 5) to provide a truer assessment of the carbon impact of the DER's 2 and/or the community of site loads $4_1$ to 4n served by the DER's 2, based on the amount of renewable energy generated by the DER 2 relative to the amount of electrical energy consumed by the site loads 4, and based on the types of energy, e.g. gasoline or natural gas, replaced by the renewable energy. In some embodiments, the correlation (and/or the association) of the producers (DER's 2) with the consumers happens simultaneously, i.e. matching producers with consumers who are active at each instant, as opposed to matching up energy consumed or produced over a period of time, where there is no guarantee that matches that are created in that approach were ever actually in play simultaneously.

Decarbonization is a very desirable goal and has economic value that depends on the particular carbon source that is being abated. For example, industrial carbon elimination is valued at about a tenth per metric ton of $CO_2$ as tailpipe emissions elimination. These differences may evolve as priorities shift. Today, due to inability to know and attribute sources of electrical energy to specific applications, communities have no way to direct, (let alone monetize) the impact of locally produced renewable energy on their own carbon elimination. Some applications are more carbon producing than others. In some cases, replacing one method, such as natural gas for electric heating, is only clearly beneficial if renewable energy is used to serve that application. Natural gas has a certain carbon footprint and efficiency. The electric grid 3 in a broad average has a certain green-ness factor that also depends on the time of day. Decarbonization is only achieved when one can replace natural gas with electricity, if green electricity is used instead of natural gas. The overall benefit also depends on how the electricity in the area, i.e. the grid 3, is produced. However, as communities are driven to a higher degree of local renewable energy penetration, e.g. 40-60% depending on the economic optimum, it also leaves room for a significant amount of energy to be sourced from utility grade renewable energy sources, e.g. solar, wind or Hydro etc., which can be accounted for by the allocation engine. So, communities can achieve a fairly even level of decarbonization as they work their way up to higher levels of local renewable energy production. Accordingly, an optional step in some exemplary embodiments includes determining the source of the electrical energy provided by the electric grid 3, and factoring the source into a calculation of carbon usage for the community.

Figure 7:
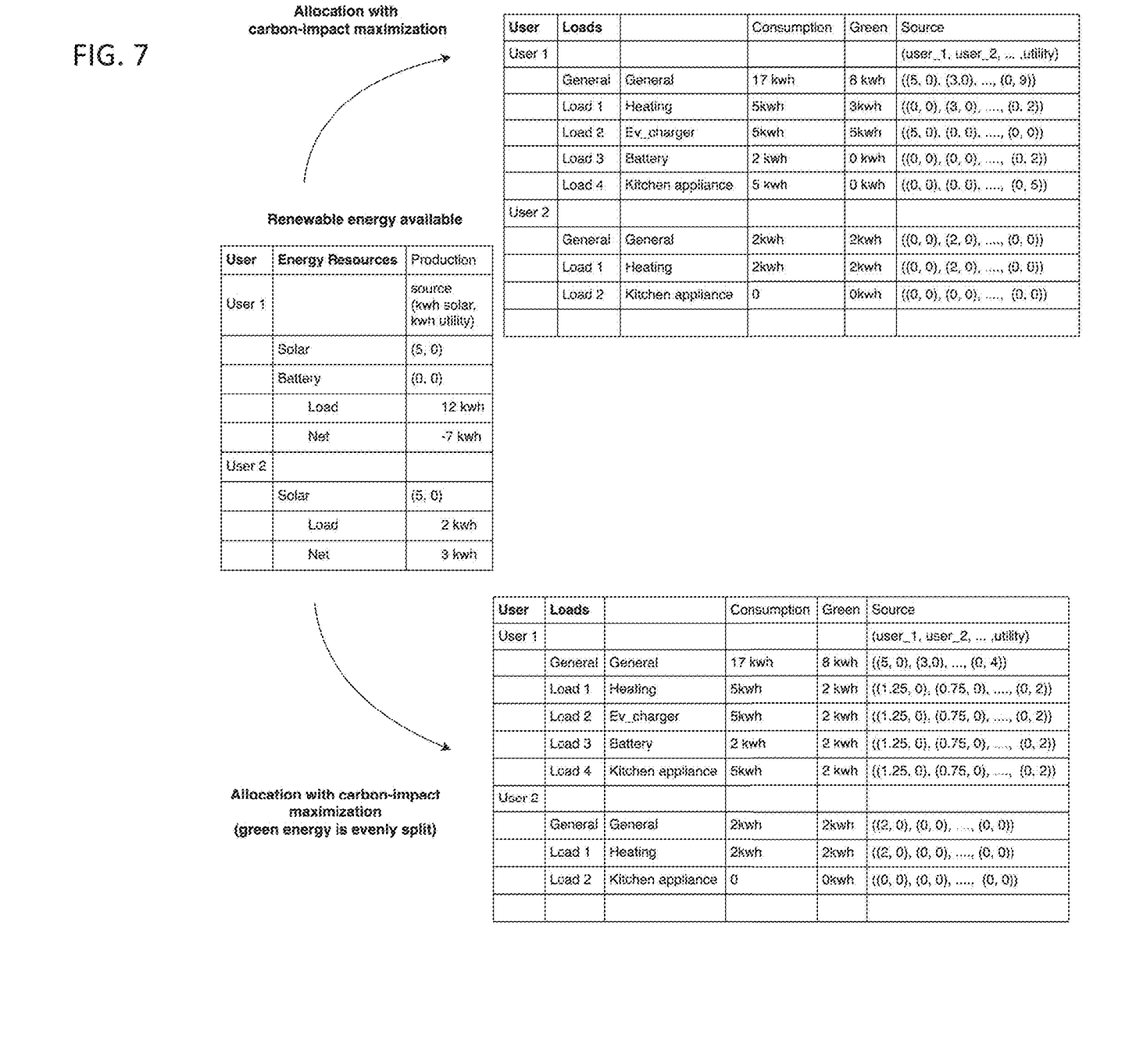
FIG. 7 illustrates exemplary allocations from the carbon tracking system of FIG. 2.

With reference to FIG. 7, the carbon tracking system 21 may generate a truer assessment of the carbon impact of the community by accounting for the production of electrical energy from each of the DER's 1 in a community with the consumption of electricity by all of the site loads $4_1$ to 4n in the community. For example: User 1 generates 5 kwh, while consuming 12 kwh, and User 2 generates 5 kwh, while consuming 3. Initially, the net load for User 1 would be a negative green load, i.e. 5 kwh–12 kwh=–7 kwh, with only 5 of the kwh designated as green, since they were generated by the renewable energy source 2. Similarly, the net load of User 2 would be a positive or surplus green load, i.e. the 5 kwh generated minus the 2 kwh consumed for a total of +3 kwh, with 2 kwh of the 2 kwh designated as green, since they were generated by a renewable energy source 2. However, since User 1 and User 2 are in the same community, in an exemplary allocation, the surplus green load of +3 kwh from User 2 is accounted for in User 1 production, offsetting some of the negative green load, resulting in 8 kwh being designated as green. In the lower allocation all of the green energy is evenly distributed between each of the loads; however, in another example provided in the upper allocation, the green energy may be allocated to a more relevant load, i.e. that more truly represents a reduction in carbon consumption, e.g. allocated to fully cover the EV charger load and partially cover the heating load.

Figure 8:
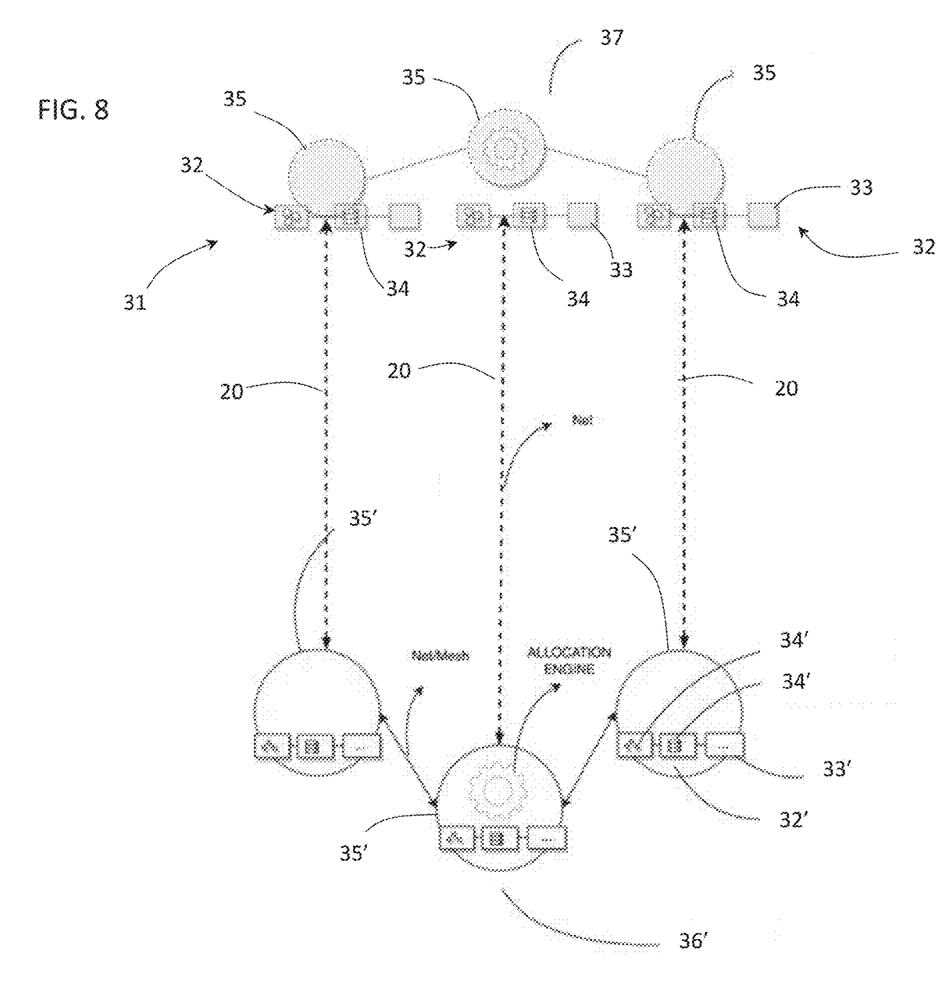
FIG. 8 is a schematic diagram of an exemplary blockchain system of the carbon tracking system of FIG. 2.

With reference to FIG. 8, in the embodiments in which one or more of the energy flow data 20, the community consumption statistics and the application information is being recorded using a blockchain network 31, each monitoring device 11 may host an embedded node 35' containing a record blockchain 32' of the blockchain 32. The monitoring devices 11 in communication, e.g. connected, with one another, via either internet, mesh connection or other suitable communication network. The embedded nodes 35' communicate bidirectionally with each other using this connection. The resulting network of embedded nodes 35' forms an embedded layer 36' of the blockchain 32' in blocks 33' in files and databases 34'. In addition to its connection to the embedded layer 36', each embedded node 35' also connects bidirectionally via a suitable communication network, e.g. internet, to a duplicate node in the cloud 24, called the avatar node 35. In the same way embedded nodes 35' connect to one another, the avatar nodes 35 in the cloud 24 also connect to one another, e.g. via internet connection. The avatar nodes 35 form the cloud layer 37 of the network. Altogether, the embedded layer 36' and the cloud layer 37 form a complete blockchain network. The embedded layer 36' and the cloud layer 37 are designed to record the same data, i.e. energy flow data 20 and application information 29, until one layer 36' or 37 loses connection, at which point the layers 36' and 37 are designed to work in isolation until connection is reestablished, and the energy flow data 20 and the application information 29 is synched again at both layers 36' or 37, thereby minimizing risk of losing any of the energy flow data 20 and the application information 29.

Figure 9:
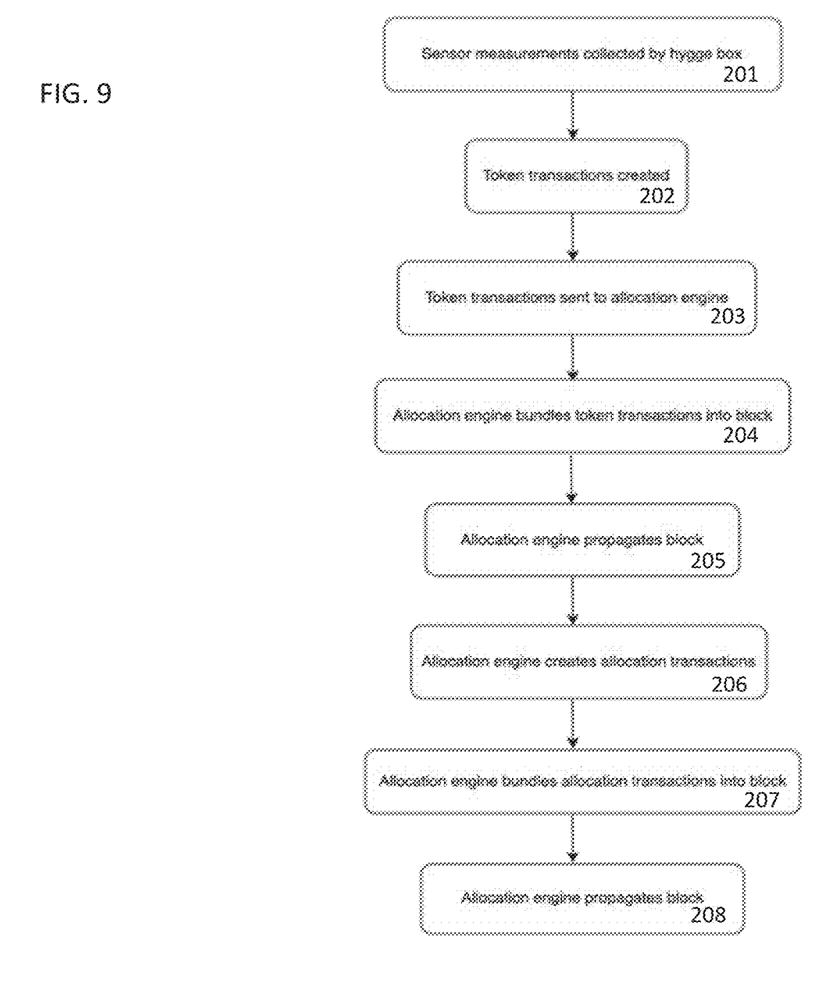
FIG. 9 is a flow chart of an exemplary method of carbon tracking with token allocation and storage.
Figure 10:
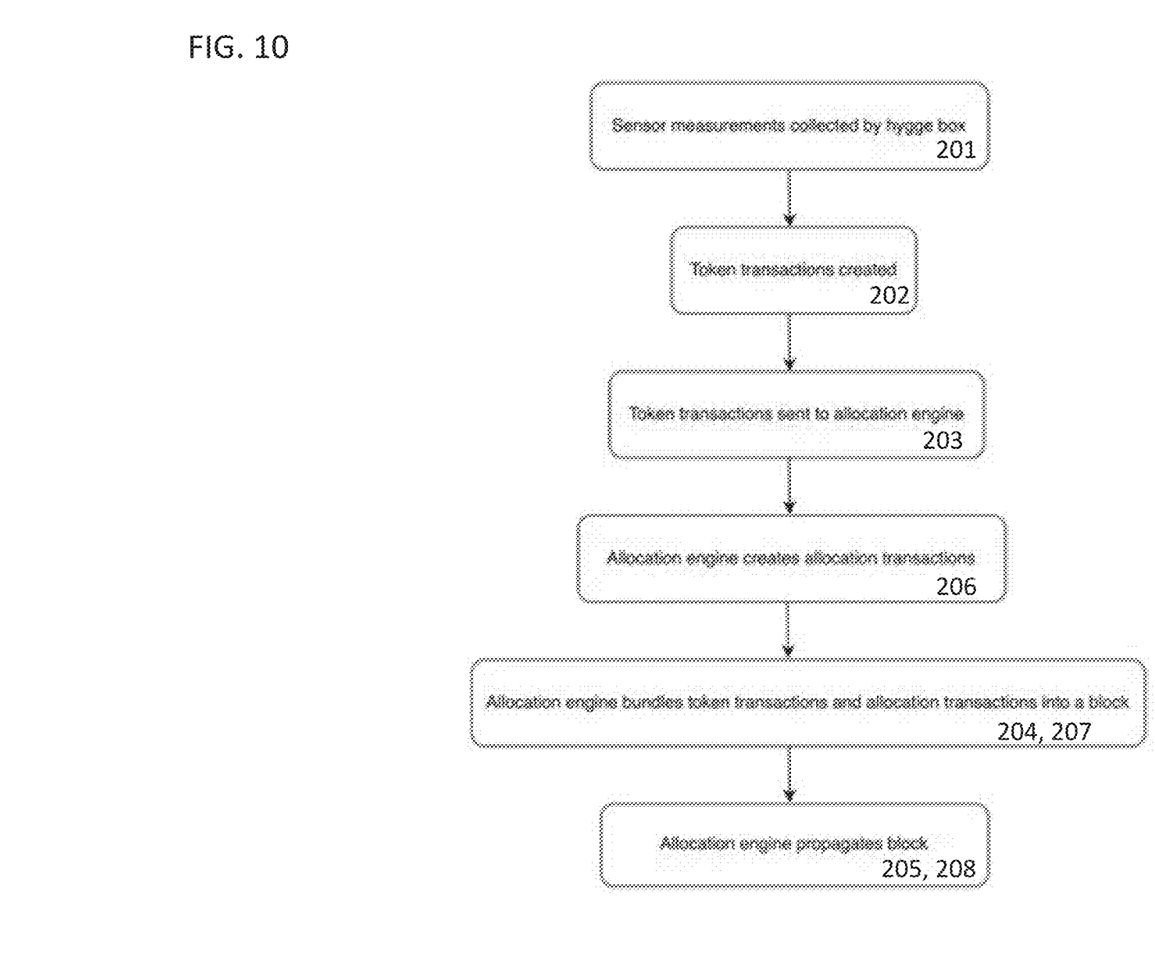
FIG. 10 a flow chart of an exemplary method of carbon tracking with token allocation and storage.

With reference to FIGS. 9 and 10, in the case where the carbon tracking system 21 records the energy flow data 20 (Step 201, similar to steps 101 and 102 from FIG. 3) in a blockchain 32, the carbon-tracking records can be used for carbon trading, e.g. obtaining carbon credits, in any carbon trading system. For example: production data may be recorded in power tokens transactions and consumption data may be recorded in consumption tokens transactions (Step 202), as disclosed in U.S. Patent Application No. 63/293,362 filed Dec. 23, 2021, entitled Energy Trading System, and then sent over to the allocation engine (Step 203). The allocation engine may generate a strategy for allocating these tokens.

When the network is configured for post hoc allocation (FIG. 9), the allocation engine bundles the power token transactions and the consumption token transactions into a block 33 (Step 204), which it then propagates across the blockchain 32 (Step 205), including to all embedded nodes 35' and avatar nodes 35. The allocation engine uses all the recorded tokens transactions at a later time to create allocation transactions (Step 206) based on its strategy for that time period. The power token and consumption token transactions are then bundled into a block 33 (Step 207) and propagated across the blockchain 32 (Step 208). In the case of an ad hoc allocation (FIG. 10), the allocation engine receives the token transactions (Steps 201-203 as above), creates the allocation transactions (Step 206) based on its strategy, and then bundles all power tokens transactions, consumption tokens transactions and allocation transactions for the interval (Steps 204 and 207 combined) into one block 33 which it then propagates across the blockchain 32 (Steps 205 and 208 combined).

Before being added to the blockchain 32, records in these blocks 33 can be reviewed by any node 35 or 35', including community members and utility, and after they are added to the blockchain 32 they cannot be modified, as disclosed for example in U.S. patent application Ser. No. 17/218,631 filed Mar. 31, 2021, entitled Optimizing Distributed Energy Resource Value in the name of Krishnamurthy et al. There are a number of advantages to using the blockchain 32 to store records. Distributing the records across many independent nodes, e.g. 35 and 35', ensures that records are unalterable and permanent. Additionally, our blockchain 32 is designed to maximize resilience by existing in two lawyers, an embedded layer 36' which resides on the monitoring devices 11 and is optimized for low power, low memory, low CPU fully, and the cloud layer 37, which can work in various states of connectivity so as to minimize impact periods of disconnection.

In a standard blockchain, all full nodes in the network keep a record of the entire existing set of blocks in the blockchain. This is cumbersome to implement in edge-devices as the chain grows quickly. In the implementation presented, the blockchain network 31 is broken into multiple smaller blockchains 32. Nodes 35 are associated with a group of nodes selected by specific criteria like proximity or similarity, known as a cohort. This allows us to retain the decentralized property of the blockchain network 31 while also ensuring that the blockchains 32 are manageable in size. Transactions may also be recorded in more than one blockchain 32, ensuring that records are difficult to modify.

In the standard blockchain, blocks are kept in perpetuity. The proposed system utilizes blocks 33 that are regularly pruned to ensure the blockchains 32 and 32' in the nodes 35 and 35' remain small. Additionally, the blocks 33 can be stored in compressed, edited or full form according to storage capabilities. These techniques help manage node size. A series of techniques for managing workload within the nodes is implemented. Tasks are distributed in round-robin fashion among nodes 35 and 35' such that no node is overwhelmed. Nodes 35 and 35' are given a period of recovery after their turn. An alternative to the standard blockchain hashing functions (SHA-256 or KECCAK-256) that is lighter to compute and that has smaller outputs is implemented. This reduces computation resource requirements and storage needs.

In some exemplary embodiments, an embedded node 35' is a blockchain node embedded in an IoT edge-device, e.g. monitoring device 11. Embedded nodes 35' host a copy of the blockchain 32 and connect to other embedded nodes 35' from other monitoring devices 11. The embedded nodes 35' receive sensor measurements from their IoT edge-devices. e.g. monitoring devices 11 and the sensors 25. The embedded nodes 35' are responsible for turning the sensor measurements into transactions, e.g. power token or consumption token, and for sending those transactions via the appropriate channels to the carbon tracking system 21. The embedded nodes 35' may also participate in mining blocks.

The foregoing description of one or more example embodiments has been presented for the purposes of illustration and description. It is not intended to be exhaustive or to limit the invention to the precise form disclosed. Many modifications and variations are possible in light of the above teaching. It is intended that the scope of the disclosure be limited not by this detailed description.

We claim:

1. A method of determining decarbonization impact of one or more distributed energy resources (DER), wherein the one or more DERs comprise renewable energy resources, with one or more related site loads in a community of consumers, wherein the one or more site loads receive electrical energy from the one or more DERs and a local energy grid, the local energy grid comprising at least some non-renewable energy resources, comprising:
   a) determining, by a plurality of monitoring devices associated with each DER and each site load, energy resource data comprising an amount of electrical energy exported by each DER, and the energy resource data further comprising an amount of electrical energy consumed by each site load from the one or more DERs and the local energy grid;
   b) obtaining, by the plurality of monitoring devices, application information for each of the plurality of applications from each site load, the application information comprising a type of application and source of the electrical energy used;
   c) determining, by a controller processor executing instructions stored on non-transitory memory, community consumption data comprising instantaneous allocations of the electrical energy exported by each DER to each site load in the community of consumers, wherein the allocations are determined from the energy resource data;
   d) correlating, by the controller processor, the energy resource data, the community consumption data, and the application information to generate carbon-tracking records indicating the decarbonization impact of each DER based on an amount of renewable energy allocated to one or more of the plurality of applications at each site load;
   e) determining, by the controller processor, a plurality of carbon-displacing applications from among the plurality of applications based on a carbon displacement value for each application, the carbon displacement value representing an amount of carbon emissions avoided by sourcing electrical energy for one or more of the plurality of applications from the renewable energy sources instead of the non-renewable energy sources; and
   f) allocating, by an allocation engine, the electrical energy exported by each DER to one or more of the plurality of carbon-displacing applications based on the carbon displacement value associated with each application.

2. The method according to claim 1, wherein step b) includes obtaining the application information from a building management system about at least one of one or more specific decarbonization target loads and their activity, the one or more decarbonization target loads comprising air conditioners and/or heaters.

3. The method according to claim 1, wherein step b) includes obtaining the application information from electrical vehicle chargers of at least one of the one or more site loads when an electrical vehicle is plugged in and charging.

4. The method according to claim 1, wherein step b) includes power disaggregation, which identifies various electrical energy loads by their power signature.

5. The method according to claim 1, further comprising storing one or more of the energy resource data, the community consumption data and the application information in a blockchain.

6. The method according to claim 5, wherein each monitoring box hosts an embedded blockchain node.

7. The method according to claim 6, further comprising storing a duplicate of each embedded node in cloud memory.

8. The method according to claim 1, wherein the community of consumers comprises a group of consumers situated in close geographic proximity, sharing a system of electrical transmission lines in a distribution network.

9. The method according to claim 1, wherein the step d) includes accounting for all of the electrical energy produced by each DER, and accounting for all of the electrical energy consumed by each site load.

10. The method according to claim 9, wherein the step d) includes attributing at least some of the electrical energy produced by each DER to the consumption of electrical energy by electrical vehicle chargers at each site load.

11. The method according to claim 1, further comprising using the carbon tracking records to obtain carbon credits in a carbon tracking system.

12. The method according to claim 11, wherein the carbon tracking records include, for each site load, an accounting of energy produced and energy consumption;
   wherein the energy consumption includes a list of each application, an amount of energy consumed, and whether the application is green; and
   wherein a green energy surplus in one of the site loads is applied to one or many green loads of other site loads with a goal to maximize the overall decarbonization impact of each DER.

13. A system for determining decarbonization impact of one or more distributed energy resources (DER), wherein the one or more DERs comprise renewable energy resources, with one or more related site loads in a community of consumers, wherein the one or more site loads receive electrical energy from the one or more DERs and a local energy grid, the local energy grid comprising at least some non-renewable energy resources, comprising:
   a plurality of monitoring devices, associated with each DER and each site load, configured to determine energy resource data comprising an amount of electrical energy exported by each DER, and the energy resource data further comprising an amount of electrical energy consumed by each site load from the one or more DERs and from the local energy grid;
   the plurality of monitoring devices configured to obtain application information for each of the plurality of applications from each site load, the application information comprising a type of application and source of the electrical energy used;
   a controller processor; and non-transitory memory storing instructions, which when executed by the controller processor is configured to:
   determine community consumption data comprising instantaneous allocations of the electrical energy exported by each DER to each site load in the community of consumers, wherein the allocations are determined from the energy resource data;
   correlate the energy resource data, the community consumption data, and the application information to generate carbon tracking records indicating the decarbonization impact of each DER based on an amount of renewable energy allocated to one or more of the plurality of applications at each site load;
   determine a plurality of carbon-displacing applications from among the plurality of applications based on a carbon displacement value for each application, the carbon displacement value representing an amount of carbon emissions avoided by sourcing electrical energy for one or more of the plurality of applications from the renewable energy sources instead of the non-renewable energy sources; and an allocation engine, configured to allocate the electrical energy exported by each DER to one or more of the plurality of carbon-displacing applications based on the carbon displacement value associated with each application.

14. The system according to claim 13, wherein the monitoring boxes are configured to obtain the application information from a building management system of at least one of the one or more site loads when an air conditioner and/or a heater turns on.

15. The system according to claim 13, wherein the monitoring boxes are configured to obtain the application information from electrical vehicle chargers of at least one of the one or more site loads when an electrical vehicle is plugged in and charging.

16. The system according to claim 13, wherein the monitoring boxes are configured to obtain application information by power disaggregation, which identifies various electrical energy loads by their power signature.

17. The system according to claim 13, wherein one or more of the energy flow data, and the application information are stored in a blockchain.

18. The system according to claim 17, wherein each monitoring box hosts an embedded blockchain node.

19. The system according to claim 18 wherein a duplicate of each embedded node is stored in cloud memory.

20. The system according to claim 13, wherein the community of consumers comprises a group of consumers situated in close geographic proximity, sharing a system of electrical transmission lines in a distribution network.

21. The system according to claim 13, wherein the controller processor is configured for accounting for all of the electrical energy produced by each DER, and accounting for all of the electrical energy consumed by each site load.

22. The system according to claim 21, wherein the controller processor is configured for attributing at least some of the electrical energy produced by each DER to the consumption of electrical energy by electrical vehicle chargers at each site load.

* * * * *